United States Patent [19]

Kutsche

[11] Patent Number: 5,527,060
[45] Date of Patent: Jun. 18, 1996

[54] LOAD-SENSITIVE VEHICULAR SUSPENSION SYSTEM

[75] Inventor: Thomas Kutsche, Schweinfurt, Germany

[73] Assignee: Fichtel & Sachs AG, Schweinfurt, Germany

[21] Appl. No.: 463,031

[22] Filed: Jun. 5, 1995

Related U.S. Application Data

[63] Continuation of Ser. No. 970,095, Nov. 2, 1992, abandoned.

[30] Foreign Application Priority Data

Nov. 2, 1991 [DE] Germany ............... 41 36 104.0

[51] Int. Cl.⁶ ............................................. B60G 11/26
[52] U.S. Cl. ............................ 280/707; 280/6.1; 280/714
[58] Field of Search ......................... 280/707, 714, 280/6.1, DIG. 1; 188/318; 364/424.05

[56] References Cited

U.S. PATENT DOCUMENTS

| | | | |
|---|---|---|---|
| 2,848,249 | 8/1958 | Bertsch et al. | 280/DIG. 1 |
| 3,021,153 | 2/1962 | Dickinson | 280/DIG. 1 |
| 3,563,270 | 2/1971 | Denny | 280/6.1 |
| 4,468,739 | 8/1984 | Woods et al. | 280/714 |
| 4,568,096 | 2/1986 | Yew et al. | 280/6.1 |
| 4,635,959 | 1/1987 | Nakano et al. | |
| 4,651,838 | 3/1987 | Hamilton et al. | 280/DIG. 1 |
| 4,986,393 | 1/1991 | Preukschat et al. | 188/318 |
| 5,044,455 | 9/1991 | Tecco et al. | |
| 5,162,996 | 11/1992 | Matsumoto et al. | 280/707 |

FOREIGN PATENT DOCUMENTS

| | | |
|---|---|---|
| 0089794 | 9/1983 | European Pat. Off. . |
| 0161872 | 11/1985 | European Pat. Off. . |
| 0262572 | 4/1988 | European Pat. Off. . |
| 0315163 | 5/1989 | European Pat. Off. . |
| 0337797 | 10/1989 | European Pat. Off. . |
| 0382480 | 8/1990 | European Pat. Off. . |
| 3637984 | 5/1988 | Germany . |
| 61-067609 | 4/1986 | Japan . |
| 62-004621 | 1/1987 | Japan . |
| 62-146709 | 6/1987 | Japan . |
| 63-041217 | 2/1988 | Japan . |
| 63-199112 | 8/1988 | Japan . |
| 1202511 | 8/1989 | Japan . |
| 2-144208 | 6/1990 | Japan ........................... 280/6.1 |
| 893262 | 4/1962 | United Kingdom . |
| 1006192 | 9/1965 | United Kingdom . |
| 1476353 | 6/1977 | United Kingdom . |
| 1604416 | 12/1981 | United Kingdom . |
| 2161982 | 1/1986 | United Kingdom . |

Primary Examiner—Eric D. Culbreth
Attorney, Agent, or Firm—Brumbaugh, Graves, Donohue & Raymond

[57] ABSTRACT

According to an embodiment of the invention it is proposed, for determining the weight of the useful load on a vehicle, that the height of the vehicle body above the chassis be determined, this height be compared with a threshold value and that a switch is made between a hard damping characteristic (for a heavy useful load) and a soft damping characteristic (for a light useful load) in a springing and damping system depending on the sign of the deviation from the threshold value.

8 Claims, 4 Drawing Sheets

LOAD-SENSITIVE VEHICULAR SUSPENSION SYSTEM

This application is a continuation of application Ser. No. 07/970,095, filed on Nov. 2, 1992, abandoned.

The invention relates to a method of influencing the operation of a springing, and simultaneously damping, suspension system arranged between a chassis and a vehicle body of a motor vehicle, in particular a utility vehicle or a van, having at least one springing and damping module arranged between the chassis and the vehicle body, with which method the damping properties of at least a portion of the springing and damping modules is varied as a function of at least one operating state quantity.

A method of influencing the springing arranged between the vehicle wheels and the vehicle body is known from DE-OS 36 37 984. In that arrangement, two adjusting cylinders with a respective spring means are provided in the region of the rear axle. The front wheels of the vehicle act as travelling scanning sensors and control the supply of fluid to the adjusting cylinders as a function of the state of the road. This is so-called active springing.

In utility vehicles and vans, active springing systems between the chassis and the vehicle body are usually avoided for reasons of cost. On the other hand, it must be taken into consideration that the springing and damping modules generally adapted to a specific average useful load lead to unsatisfactory travel in the case of marked deviations from this average load.

The object of the invention is to adapt the suspension properties to a varying useful load with low expenditure employing a method of the type mentioned at the outset.

To achieve this object it is proposed according to the invention that the damping properties are varied as a function of the useful load received by the vehicle body such that a greater damping force is produced in at least one, preferably in both, spring directions in the case of a heavier useful load.

The damping properties may be combined with relatively low expenditure on control means by varying a cross section for the throughflow of fluid having a damping effect, in particular cross section for the throughflow of liquid, on vibration dampers, for example in that, from a number of courses for the throughflow of fluid having a damping effect, one is selected in each case or in that various courses for the throughflow of fluid having a damping effect are combined with one another. It has been found that the travelling behaviour of vehicles which are run with greatly varying useful loads, may be considerably improved independently of the respective weight of the useful load by this control measure which is associated with relatively low expenditure.

It should not be forgotten that active control can also take place by varying the degree of filling of optionally shock-absorbing adjusting cylinders. For reasons of cost, a preferred application of the invention resides in the exclusive influencing of the damping properties which has proven adequate for comfort and safety in travel in inexpensive motor vehicles, in particular utility vehicles and vans.

As the variations in the useful load are most noticeable in the region of the rear axle of utility vehicles and vans, it is also proposed that the damping properties of the springing and damping modules allocated to a rear axle of the motor vehicle preferably be varied simultaneously and to the same extent in each case.

The variation in the damping properties as a function of the weight of the useful load may be carried out continuously or stepwise. Again with respect to the saving in cost, the stepwise variation of the damping properties is preferred because inexpensive components, in particular shock absorbers having a characteristic curve which may be varied stepwise, are available for this purpose.

The variation in the damping properties may be carried out such that an actual load signal dependent on the weight of the useful load is formed, this actual load signal is compared with a threshold signal so as to form a differential signal and this differential signal is used to vary the damping properties.

The methods of measurement available for determining the useful load deliver varying measured values. Suitable methods of measurement include distance-measurement between chassis and vehicle body, in particular in the region of individual springing and damping modules. Fluid pressure measurements in the region of individual springing and damping modules and, here again, in particular on the shock absorbers of these springing and damping modules, can be employed. The measured values determined by such methods of measurement are dependent not only on the weight of the useful load but also on states of vibration which may arise, for example owing to cornering, braking, acceleration or poor road conditions. To achieve a suitable criterion for variation of the damping properties as a function of the useful load, it is also proposed that the damping properties be varied only when a specific measured value, for example the above-mentioned differential signal, maintains a specific sign and/or a specific value for a predetermined minimum time period.

The fact that the useful load distribution on a vehicle may be markedly asymmetrical should also be allowed for. It can be allowed for in that a distance measured value between chassis and vehicle body is used as a criterion for a variation in damping, this distance measured value being determined in the central region between the two wheels of the rear axle. Such a distance measured value is substantially independent of the symmetry of the load distribution.

If the measured values are to be measured for determining the damping properties in the region of the wheels, in particular in the region of the rear wheels, an actual load signal may be determined by averaging of actual partial load signals of at least two springing and damping modules, for example in the region of the rear axle of the vehicle.

The invention also relates to a springing and damping suspension system between a chassis and a vehicle body of a motor vehicle, in particular a utility vehicle or a van, comprising at least one springing and damping module arranged between the chassis and the vehicle body, wherein the damping properties of at least a portion of the springing and damping modules may be influenced by at least one operating state variable sensor.

In view of the above-mentioned object, it is proposed for such a suspension system that the damping properties be influencable by at least one useful load sensor such that a greater damping force is produced in at least one springing direction, preferably in both springing directions, in the case of a greater useful load.

The useful load sensor may be designed and switched, in particular, such that it varies the springing and damping modules allocated to one axle, in particular the rear axle. The damping properties in the springing and damping modules of an axle are to be varied simultaneously, more specifically to the same extent in each case, for reasons of comfort and safety in travel.

The useful load sensor may be designed to produce an actual load signal dependent on the useful load. This useful load sensor may be combined with a threshold signal generator and with an actual load threshold comparator which delivers a differential signal capable of influencing the damping properties. For adaptation to individual types of vehicle and/or individual vehicle owner's wishes, it is conceivable to make the threshold value predetermined by the threshold generator variable.

In view of the above-described ambiguity of measured values, it is proposed that the threshold value comparator be linked to a timer such that the differential signal changes the damping properties only when a differential signal having a predetermined sign and optionally predetermined value exists for a predetermined minimum time period. A type of hysteresis effect can be achieved by predetermining a specific value for the differential signal, so that undesirable frequent switching between different damping properties is avoided.

The length adjustment sensors which can be used as useful load sensors may be of any design, for example inductive length adjustment sensors are suitable.

Any fluid pressure sensors used are known as such and are commercially available.

A useful load sensor which is suitable for useful load determination independently of the useful load distribution may be designed with at least two partial load sensors, in particular with one partial load sensor on every two springing and damping modules of a rear axle. These partial load sensors may then be connected to an averaging device for producing a resultant actual load signal.

Vibration dampers which are suitable for use in a suspension system according to the invention are known as such. They may be vibration dampers in which the cross section for the throughflow of a vibration damper piston is variable for at least one vibration direction, possibly also for both vibration directions, for example by means of a variation signal supplied via the piston rod. However, vibration dampers may also be used in which a bypass line which can be switched by a shut-off signal in parallel with a piston throughflow is provided on the cylinder. In that arrangement, the throughflow through the piston or/and the throughflow through the bypass can take place via a valve which opens as a function of pressure. The damping characteristic can be varied by connection of the bypass. The connection and disconnection of the bypass may be carried out by a shut-off valve actuated by an electromagnet or an electric motor.

The accompanying drawings illustrate three embodiments of the invention.

Figure 1:
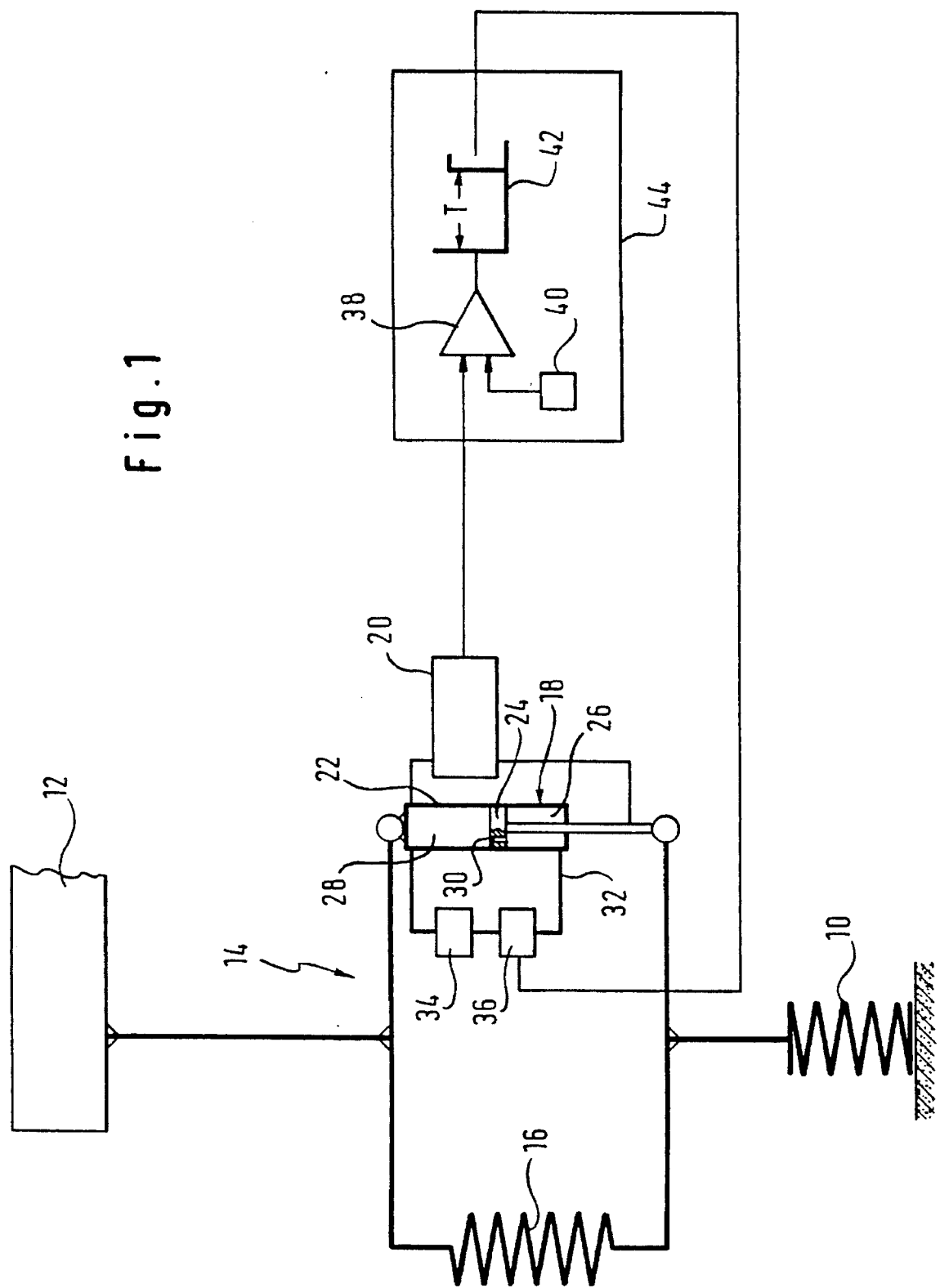
FIG. 1 is a functional diagram of the invention, shown by means of a partial vehicle.

In FIG. 1, a wheel, for example a rear wheel, of a vehicle is symbolised by a spring 10. A part 12 of a vehicle body is supported on the axle of this wheel, more specifically by means of a springing and damping module 14 consisting of a springing element 16 and a vibration damper 18. The vibration damper 18 is allocated a length measuring device 20 which detects the respective length of the vibration damper and therefore supplies a gauge of the height of the vehicle body 12 above the wheel axle. The length adjustment of the vibration damper 18 is related to the weight of the useful load loaded on the vehicle body 12. In the example, the vibration damper 18 is designed as a single tube vibration damper of which the cylinder 22 is divided into two working chambers 26 and 28 by the piston 24. The piston 24 is connected to a passage which is indicated schematically at 30 and which connects the two working chambers 26 and 28 to one another. This passage may obviously be formed by two passages having specific directions. These passages may be formed, for example, by pressure-sensitive valves of which the passage cross section depends on the differential pressure between the two working chambers 26 and 28. The two working chambers 26 and 28 are also bridged by a bypass 32. A bypass valve 34 which may be permeated in two directions, opens as a function of pressure and of which the passage cross section is again dependent on the pressure difference between the two working chambers 26 and 28 is located in this bypass 32. A shut off valve 36 is connected in series with the bypass valve 34. The piston valve 30 and the bypass valve 34 may be connected in parallel by opening this shut off valve 36. The bypass 32 may be made ineffective by closing the shut off valve 36. It can therefore be seen that the damping characteristic of the shock absorber 22 may be varied by opening or closing the shut off valve 36. A hard damping characteristic exists when the shut off valve 36 is closed and a soft damping characteristic when the piston valve 30 and the bypass valve 34 are connected in parallel.

The hard damping characteristic is desired for loading the vehicle body with a heavy useful load and the soft damping characteristic for loading the vehicle body 12 with a light useful load.

The weight of the useful load produces, in the length measuring device 20, a signal which is supplied to a threshold comparator 38. A threshold signal 40 is also supplied to the threshold comparator 38 by a threshold signal generator 40. The threshold value comparator produces a differential signal with a sign which differs according to whether the actual load signal produced in the length measuring device 20 is greater or smaller than the threshold signal produced by the threshold signal generator 40. The comparator 38 is connected to a detector 42 which determines how long the differential signal produced in the comparator 38 lasts. If this differential signal lasts for a predetermined minimum period T, a switch signal is transmitted to the shut off valve 36 in the electronic unit 44 so that the shut off valve 36 is opened or closed depending on the sign of the differential signal. This ensures that variations of length in the length measuring device 20 originating from vibrations of the vehicle body are not taken into consideration and the changeover takes place only as a function of the useful load, i.e. the changeover to hard vibration damping characteristic when a heavy useful load is present and the changeover to a soft vibration damping characteristic when a light useful load is present. Since a changeover signal is produced only when the differential signal reaches a specific minimum value, hysteresis behaviour can be achieved so that frequent opening and closure of the shut off valve 36 does not occur even when the respective useful load corresponds to the adjusted threshold value.

Figure 2:
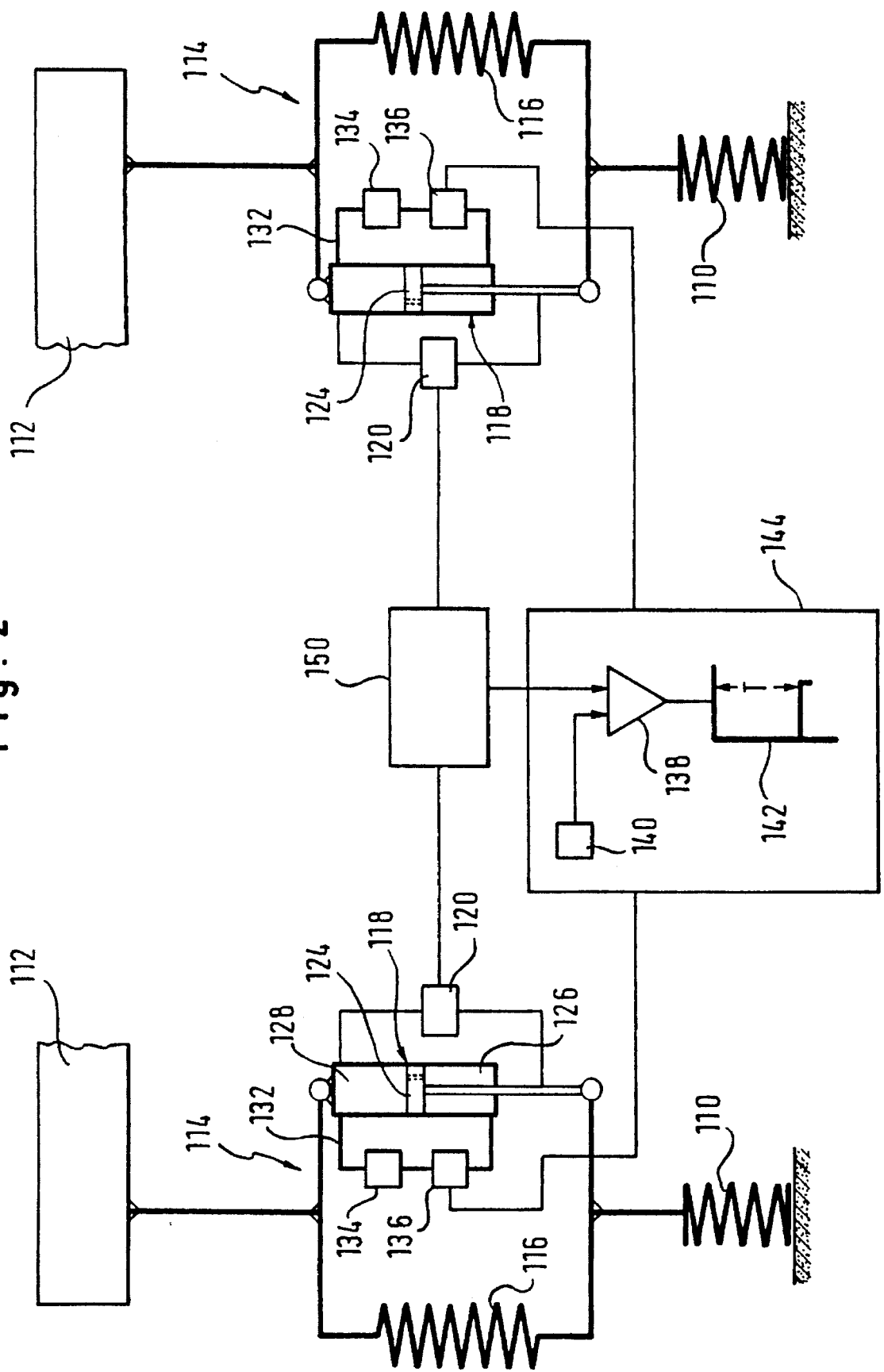
FIG. 2 shows an embodiment of the invention with variation of damping in the springing and damping modules of a rear axle.

FIG. 2 shows a rear axle with two wheels 110. The springing and damping modules are constructed according to FIG. 1 and are provided with the same reference numerals each increased by 100.

In this embodiment, load-sensitive measured length values are measured on the length measuring devices 120 of the two springing and damping modules 114. An average value is formed in a computer 150 by them. This average signal is compared with a threshold signal of the threshold signal generator 140 in the comparator 138. The differential signal of this comparator 138 is investigated in the detector 142 to determine whether it lasts over the predetermined period T. If it lasts over this predetermined period T, a changeover signal is transmitted to the shut off valves 136 by the electronic unit 144. In this embodiment, the weight of the useful load is determined substantially independently of the distribution of the useful load in the vehicle body 112.

Figure 3:
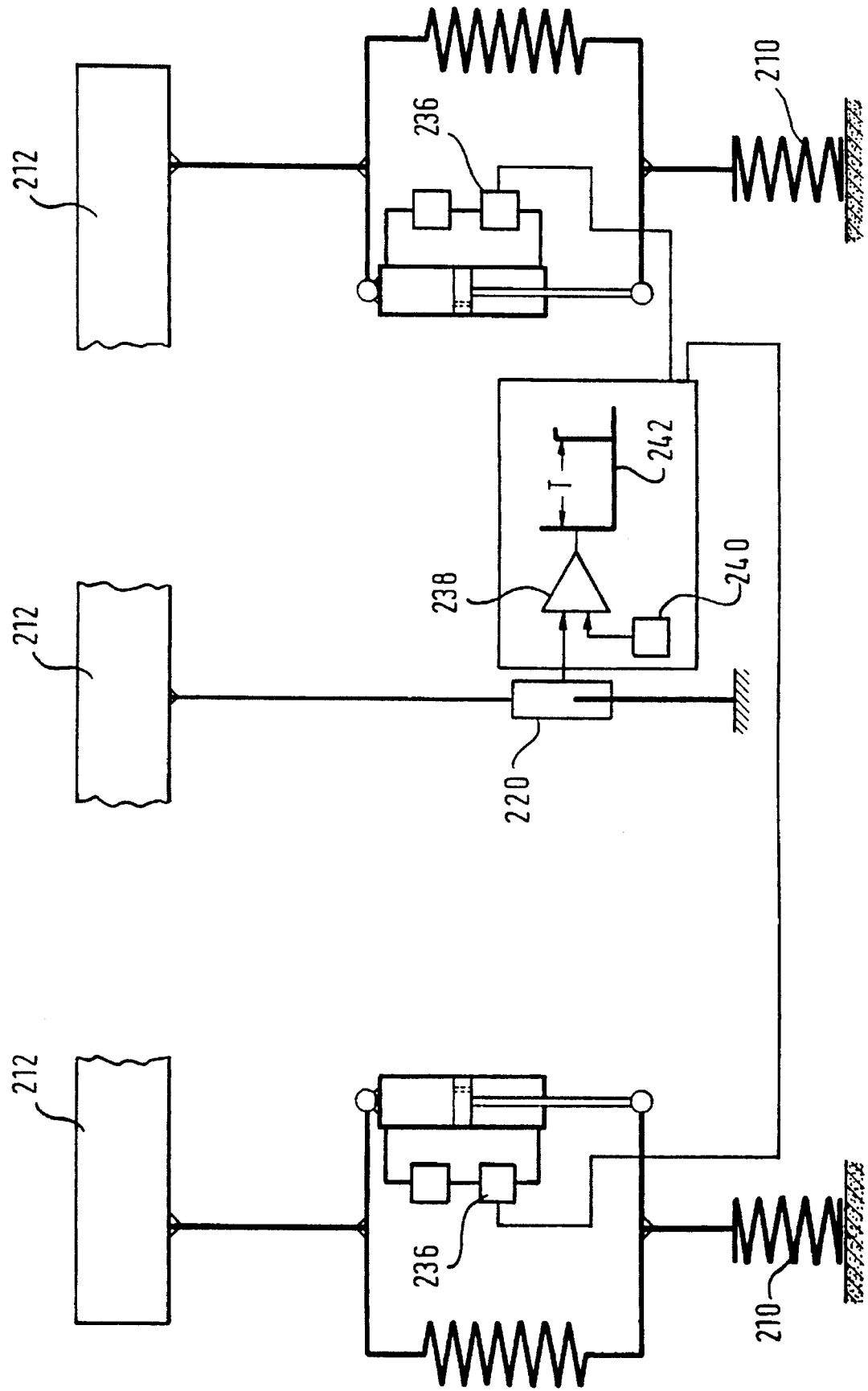
FIG. 3 is a variation of FIG. 2.
Figure 4:
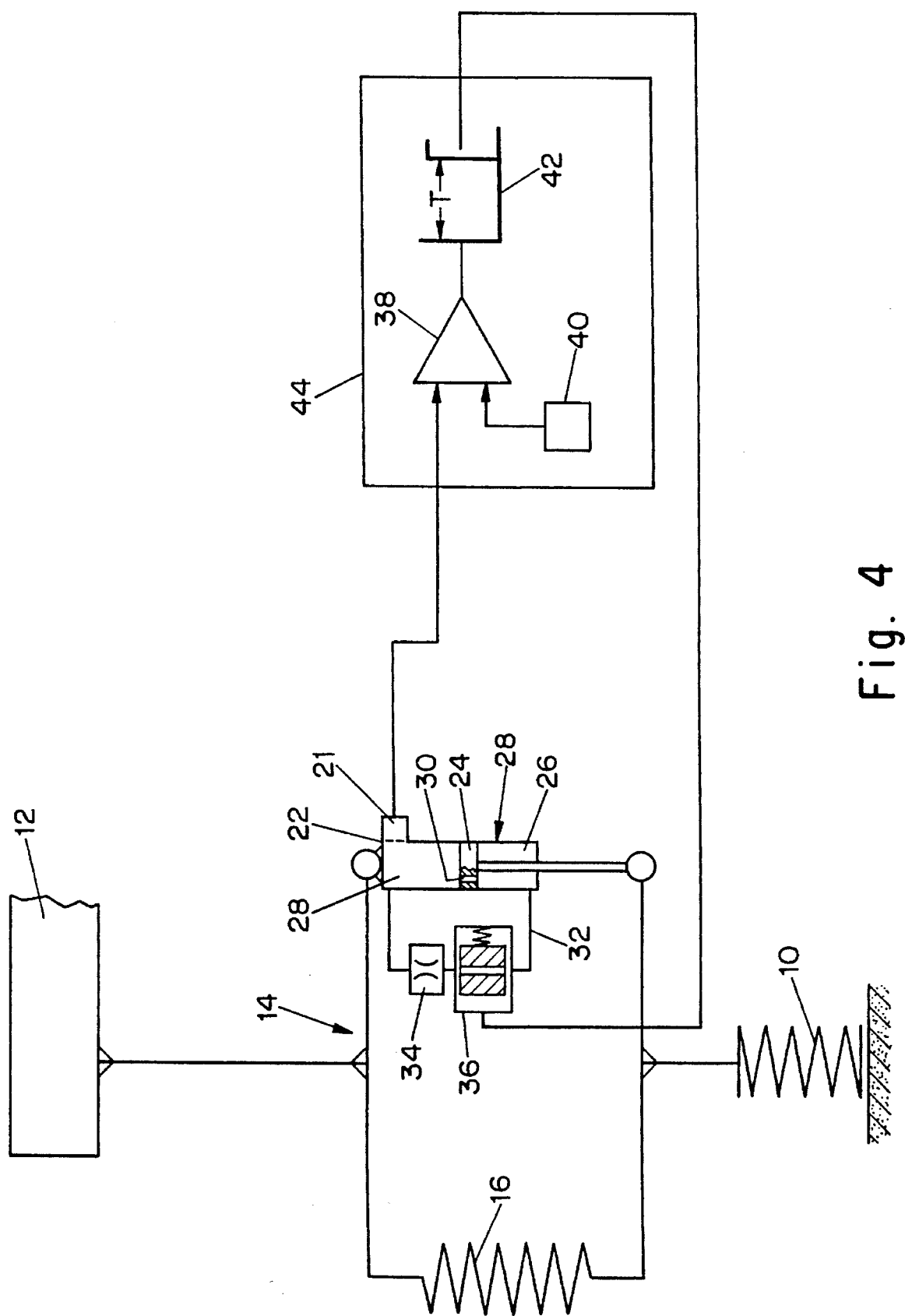
FIG. 4 is a diagram of a variation of the embodiment of FIG. 1.

The embodiment according to FIG. 3 differs from that according to FIG. 2 only in that an inductive height measuring device 220 is provided between the two wheels 210 and determines the height of the vehicle body in the central region between the two wheels relative to the chassis, for example of a rigid axle. The measured variable determined in the height measuring device 220 is compared with the threshold signal of the threshold signal generator 240 and is processed by means of the comparator 238 and the detector 242 in the manner described in connection with FIGS. 1 and 2. Finally, shut off valves 236 are therefore also changed over here to soft or hard damping characteristic as a function of the weight of the useful load. FIG. 4 illustrates a variation of the embodiment of FIG. 1. All of the corresponding components are assigned the same reference numerals as in FIG. 1. A pressure sensor 21, which senses the pressure in the fluid in the damper (which pressure is indicative of the weight of the vehicle body), is substituted for the length measuring device 20 of FIG. 1. The output signals from the processor 44 open and close the shut-off valve 36 in the parallel flow path 32 to permit or prevent, respectively, fluid to flow between the chambers 26 and 28 of the damper in parallel with the passage 30.

I claim:

1. A motor vehicle comprising a plurality of wheel units, said plurality of wheel units including two wheel units mutually spaced along a transverse direction of the motor vehicle, a suspension system, said suspension system including a springing and damping module allocated to each of said rear wheel units, each said springing and damping module including spring means and an oscillation damper group, each said oscillation damper group having a cylinder, a piston rod-piston unit and fluid chambers of variable volume, a damping fluid within said fluid chambers and flow path means extending between respective fluid chambers for allowing damping fluid to flow through said flow path means in response to relative movement of said cylinder and said piston rod-piston unit, said flow path means having through-flow cross-section variation means, said through-flow cross-section variation means being controllable by common control means, each said oscillation damper group having a mutually independent filling of damping fluid and each said oscillation damper group being independent of external damping fluid supply means such that the damping characteristics of each said oscillation damper group are substantially solely dependent on the adjustment of said through-flow cross-section variation means under the control of said common control means, each said oscillation damper group being provided with a respective load sensor means, said respective load sensor means of both oscillation damper groups being operationally connected to said common control means of said oscillation damper groups, said common control means including an averaging device, said averaging device producing an average value of respective useful loads measured by said partial load sensor means, said common control means providing control signals for both oscillation damper groups in dependency on said average value, and said through-flow cross-section variation means of both said oscillation damper groups being variable by said control signals simultaneously and to the same extent.

2. The motor vehicle of claim 1, said through-flow cross-section variation means being continuously variable by said common control means.

3. The motor vehicle of claim 1, said through-flow cross-section variation means being stepwise variable by said common control means.

4. The motor vehicle of claim 1, said average value being fed to a first input of comparator means, a second input of said comparator means being connected to a threshold signal generator, said comparator means providing a differential signal, said differential signal being used for controlling said through-flow cross-section variation means.

5. The motor vehicle of claim 4, said comparator means being combined with timer means in such a way that said through-flow cross-sectional variation means are actuated by said differential signal only when said differential signal occurs for a predetermined time interval.

6. The motor vehicle of claim 1, said load sensor means of each said oscillation damper group comprising a distance sensor means.

7. The motor vehicle of claim 6, each said distance sensor means being combined with the respective oscillation damper group by connecting means connecting said respective distance sensor means with said cylinder on the one hand and with said piston rod-piston unit on the other hand.

8. The motor vehicle of claim 1, each said respective load sensor means being fluid-pressure sensor means.

* * * * *

UNITED STATES PATENT AND TRADEMARK OFFICE
CERTIFICATE OF CORRECTION

PATENT NO. : 5,527,060
DATED : June 18, 1996
INVENTOR(S) : Thomas Kutsche

It is certified that error appears in the above-indentified patent and that said Letters Patent is hereby corrected as shown below:

Col. 5, line 20, "FIG. 4" should start a new paragraph;
Col. 5, line 33, "two" should read --two rear--;
Col. 6, line 14, "said partial" should read --said respective--.

Signed and Sealed this

Twenty-fourth Day of September, 1996

Attest:

BRUCE LEHMAN

*Attesting Officer*     *Commissioner of Patents and Trademarks*